United States Patent [19]
Enderlein et al.

[11] Patent Number: 5,794,534
[45] Date of Patent: Aug. 18, 1998

[54] SORTING INSTALLATION FOR SORTING INDIVIDUALLY CONVEYED OBJECTS

[75] Inventors: Robby Enderlein, Landsberg a. Lech; Johann Robu, Olching, both of Germany; Hansjörg Geiger, Schwaz, Austria

[73] Assignee: MTS Modulare Transport Systeme GmbH, Vomp, Austria

[21] Appl. No.: 718,506
[22] PCT Filed: Apr. 12, 1995
[86] PCT No.: PCT/EP95/01367
§ 371 Date: Oct. 3, 1996
§ 102(e) Date: Oct. 3, 1996
[87] PCT Pub. No.: WO95/27673
PCT Pub. Date: Oct. 19, 1995

[30] Foreign Application Priority Data

Apr. 12, 1994 [DE] Germany .............. G 94 06 061.4

[51] Int. Cl.⁶ ...................................... B61B 3/00
[52] U.S. Cl. .......................... 104/88 R; 104/89; 104/96; 209/540; 198/434
[58] Field of Search ............................ 104/89, 91, 93, 104/88.01, 88.02, 88.03, 88.04, 88.05, 88.06, 130.1; 209/2, 44.1, 509, 539, 540, 606; 198/347.2, 347.4, 465.4, 434

[56] References Cited

FOREIGN PATENT DOCUMENTS

| 0 099 279 | 1/1984 | European Pat. Off. |
| 2 577 500 | 8/1986 | France |
| 24 09 999 | 9/1975 | Germany |

Primary Examiner—Mark Tuan Le
Attorney, Agent, or Firm—Lyon & Lyon LLP

[57] ABSTRACT

A suspension conveyor comprises two conveyor circuits which circulate in opposite directions. The circuits are arranged on opposite sides of an additional conveyor path, where the conveying directions of the path and circuits are the same at their point of coincidence. Roller devices for carrying objects (a, b, . . . , n), are entrained by a pushing or pulling mechanism of the conveyor circuits. A controllable switch arranged between the conveyor circuits, for transferring the objects individually from one of the conveyor circuits to the other, is adapted to transfer the objects selectively from the conveyor path to either of the conveyor circuits and vice versa. The switch is also adapted to selectively allow the objects to travel past the switch without leaving the respective conveyor circuit in which the objects are present. The suspension conveyor is additionally a sorting installation for sorting numerous different individually conveyed objects (a,b, . . . n). The additional conveyor path forms part of both conveyor circuits over at least an infinitesimal path portion at the location of the switch.

7 Claims, 11 Drawing Sheets

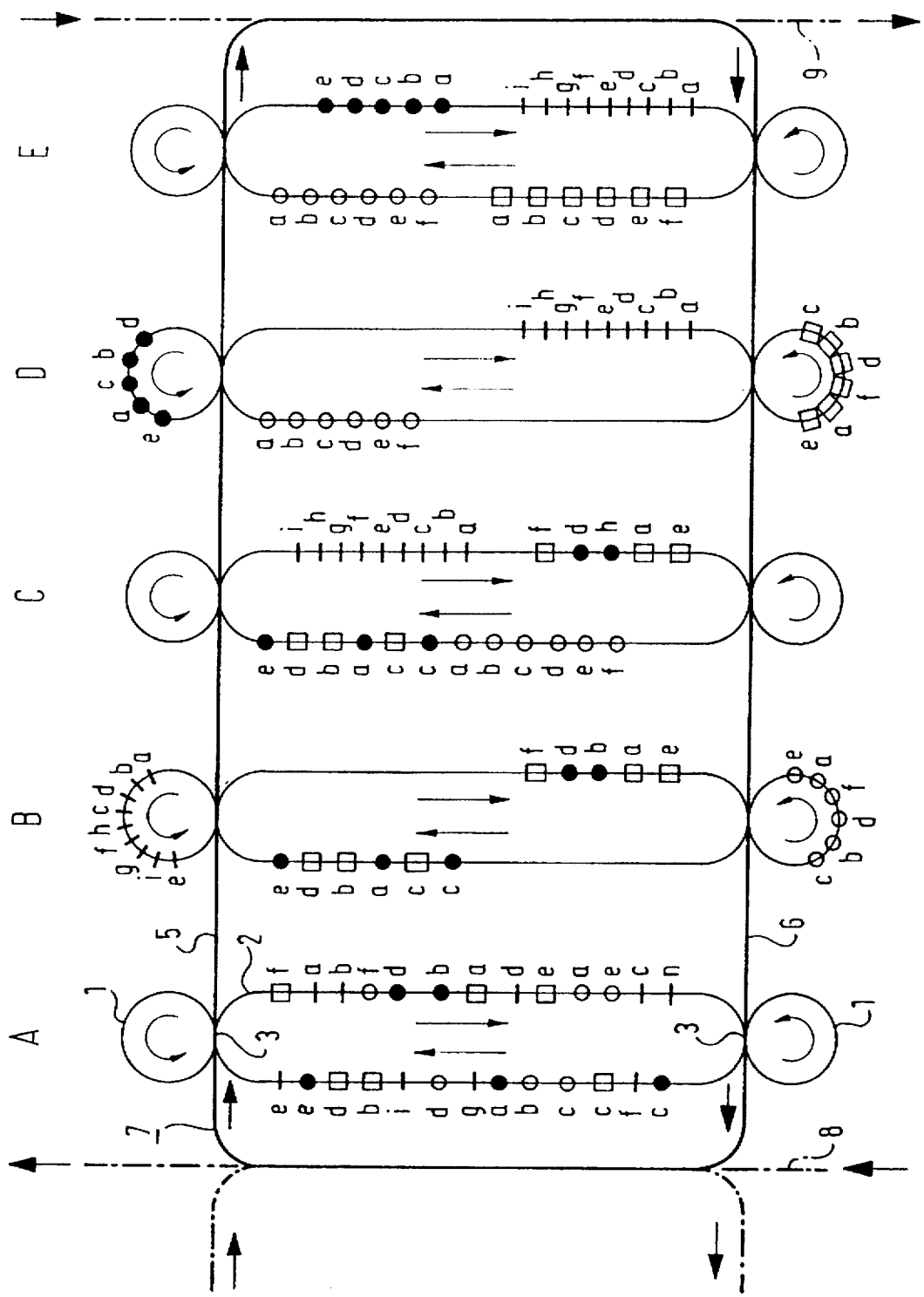

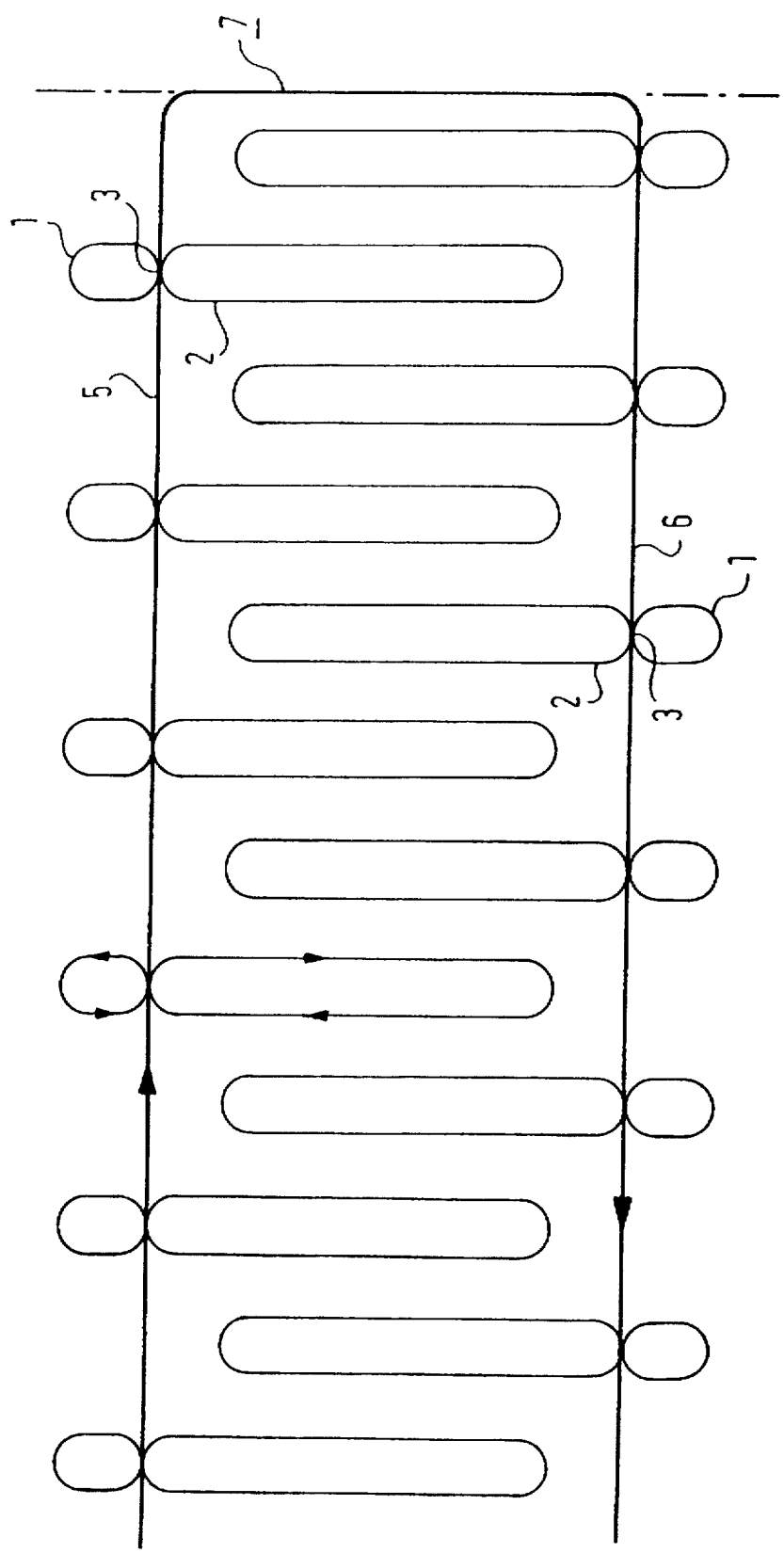

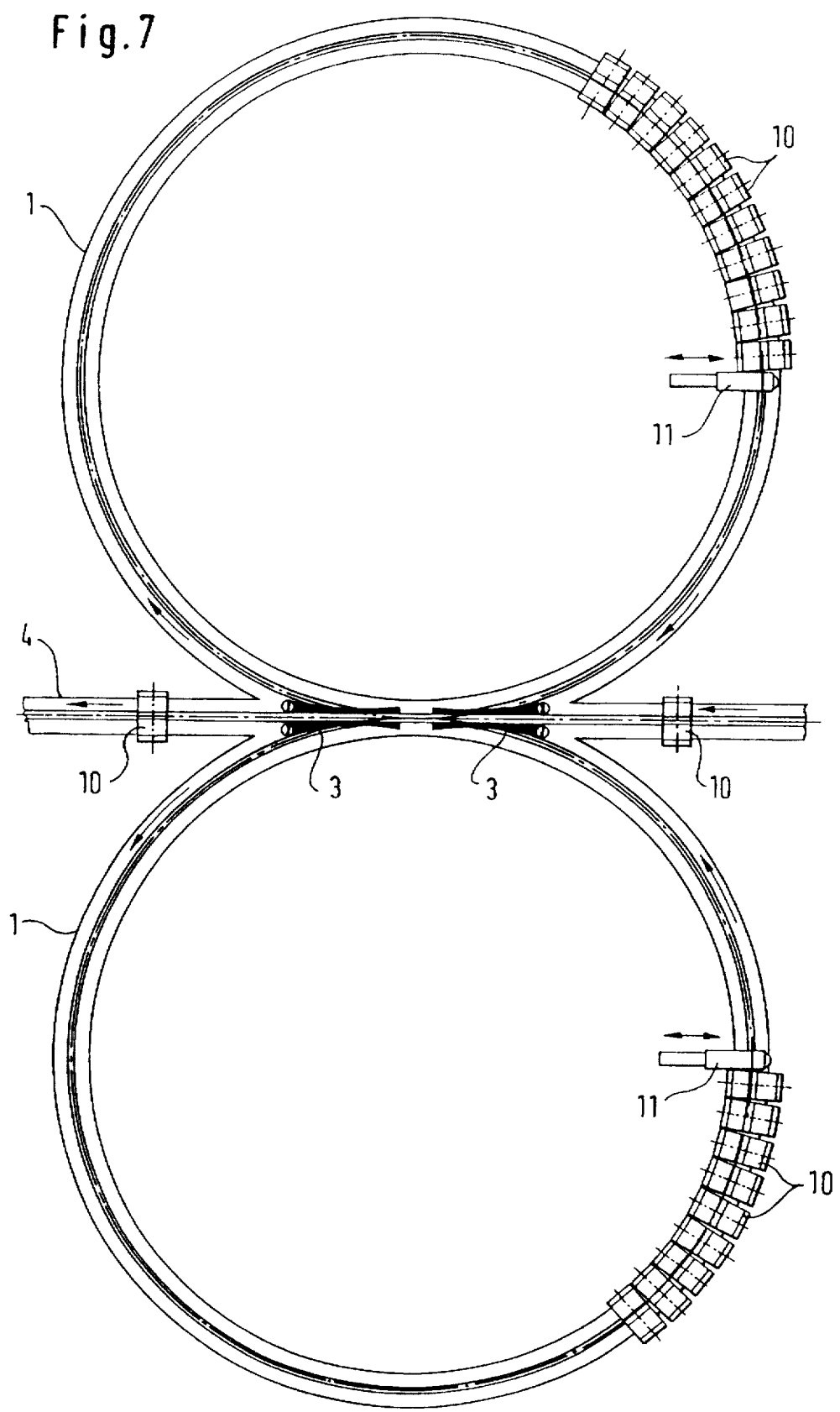

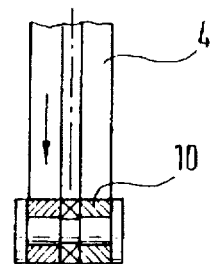
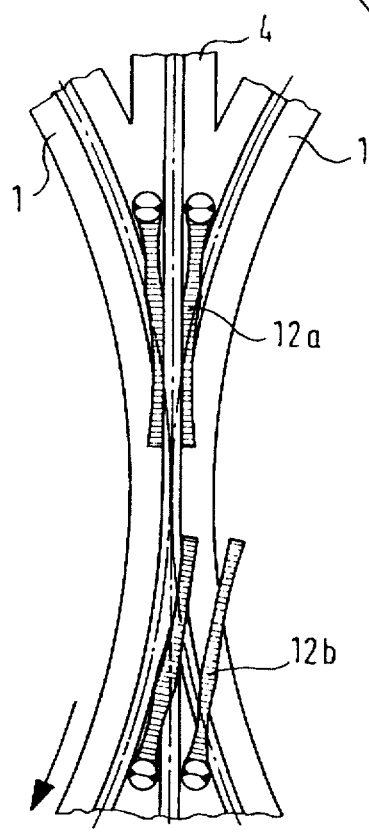
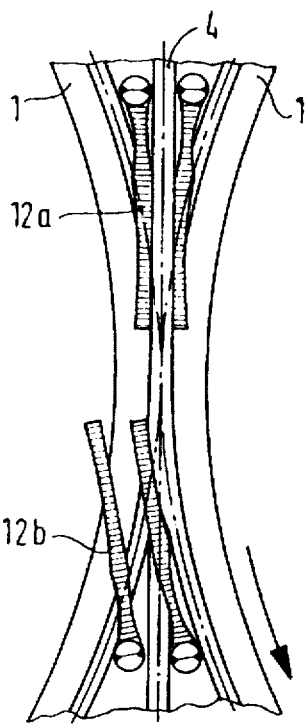
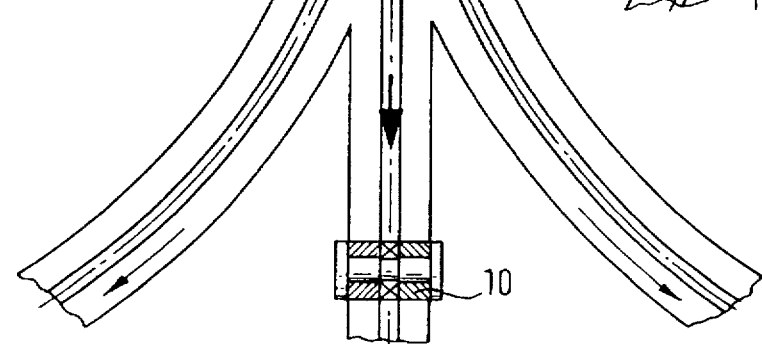

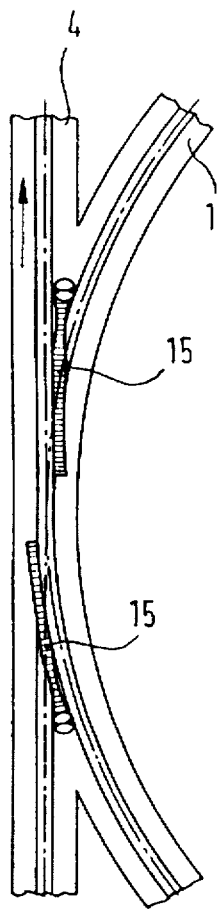
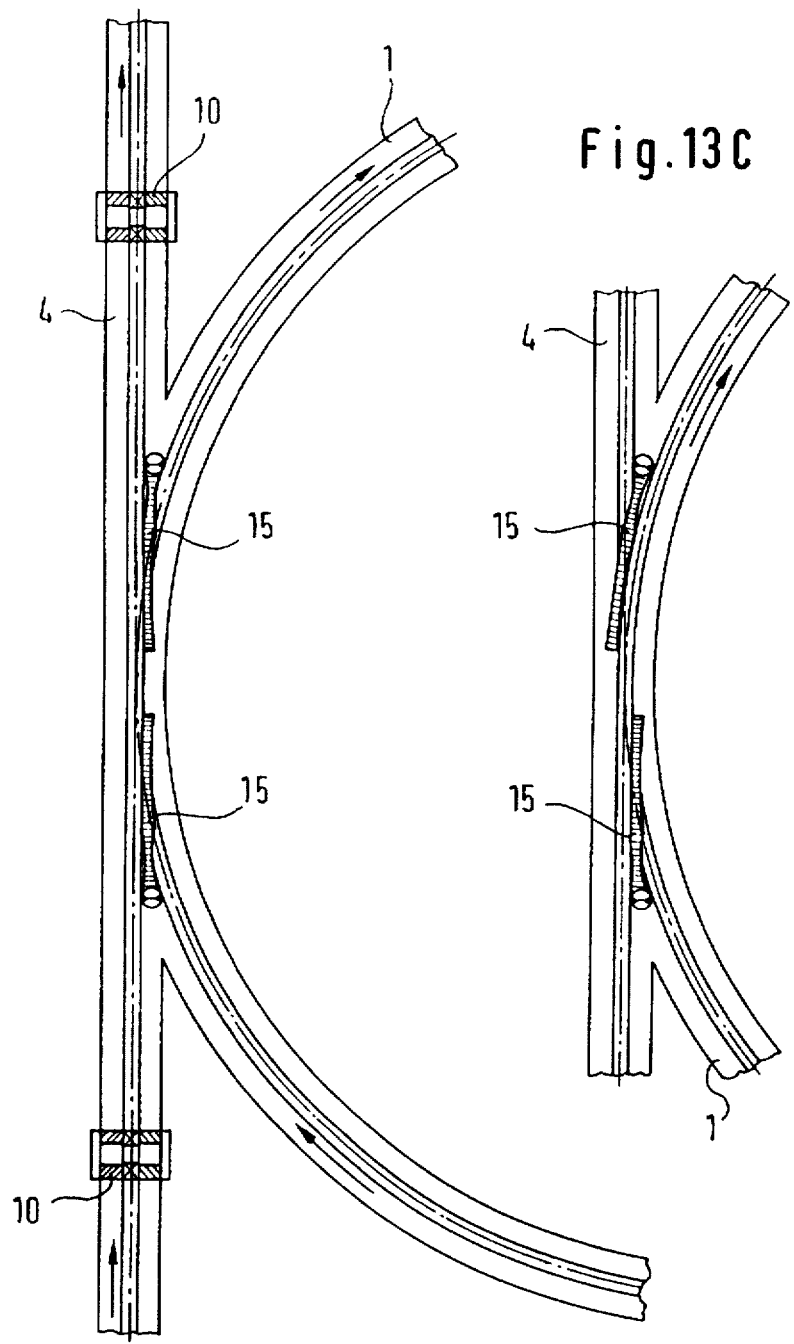
Fig. 13A
Fig. 13B
Fig. 13C 5,794,534

1

SORTING INSTALLATION FOR SORTING INDIVIDUALLY CONVEYED OBJECTS

FIELD OF THE INVENTION

The invention relates to a suspension conveyor in which objects are carried by and transferred between conveyor circuits.

BACKGROUND OF THE INVENTION

A conveyor for sorting clothes suspended from coat hangers has been suggested (EP-A1-0 582 224) wherein the unsorted clothes circulate with their coat hangers in one of the conveyor circuits and are selectively transferred to a second conveyor circuit through an automatically actuable switch. In the second circuit, the transferred clothes are sequentially accumulated in individual groups. However, such a sorting process is still relatively time consuming.

Another conveyor is known from the FR 2-577-500. It relates to a suspension conveyor where two conveyor circuits are driven to circulate in opposite directions, and are arranged as a conveyor circuit pair on opposite sides of an additional conveyor path. Roller devices are adapted to be pushed or pulled by the conveyor circuits, for carrying objects (a, b, . . . , n). A controllable switching means is arranged between the conveyor circuits, for transferring the objects individually from one of the conveyor circuits to the other conveyor circuit, and is adapted to transfer the objects selectively from the conveyor path to either of the conveyor circuits and from either of the conveyor circuits to the conveyor path. This conveyor, however, is not suitable for sorting objects but for transporting workpieces to work stations. For this reason, a transfer mechanism is provided, transferring the workpieces from a conveyor path to an inclined guide rail. The workpieces are transported by gravity along the inclined guide rail to the work station. After the workman has finished his work on the workpiece, it is transported back to the conveyor path via a slope conveyor.

SUMMARY OF THE INVENTION

Like FR 2-577-500, the invention relates to a suspension conveyor where two conveyor circuits are driven to circulate in opposite directions, and are arranged as a conveyor circuit pair on opposite sides of an additional conveyor path. Roller devices are adapted to be pushed or pulled by the conveyor circuits, for carrying objects (a, b, . . . , n). A controllable switching means is arranged between the conveyor circuits, for transferring the objects individually from one of the conveyor circuits to the other conveyor circuit, and is adapted to transfer the objects selectively from the conveyor path to either of the conveyor circuits and from either of the conveyor circuits to the conveyor path.

The invention, however, may be used to sort all such objects which are arranged serially in any irregular order and are to be sorted into a predetermined order or assembled to groups of a predetermined order. In a preferred embodiment, the conveyor is designed to automatically sort clothes suspended from coat hangers which, in turn, are suspended from roller devices running on rails and driven by conveying means, preferably through pushers. In such an arrangement, identification codes may be attached to the coat hangers or roller devices and may be detected by sensors, the signals of which are fed to the control unit of the installation. The conveyor paths and conveyor circuits may in particular be arranged as stoppage or accumulation paths or circuits,

2 respectively, in which the objects can be accumulated by means of stop members engaging the roller devices while the conveying means continues circulating. This may be achieved, for example, by releasing the drive connection between the circulating conveying means and the particular roller device partly or entirely or in such a manner that the connection remains engaged only in the form of a slight friction.

The invention solves the problem of how to design a sorting installation of the above-mentioned type such that even the sorting of numerous different objects conveyed in the sorting installation can be carried out in a speedy manner.

In accordance with the invention, this object is achieved by the following novel features: First, the suspension conveyor of the present invention is a sorting installation for sorting numerous different individually conveyed objects (a,b, . . . n) sorted in the sorting installation in a speedy manner. Second, the conveyor circuits and the additional conveyor path extend within one plane. Third, the additional conveyor path forms part of both conveyor circuits over at least an infinitesimal path portion at the place of the switching means and extends over the at least infinitesimal path portion in the same direction as the conveyor circuits. Fourth, the switching means is adapted to selectively allow the objects to travel past the switching means without leaving the respective conveyor circuit in which the objects are present.

Thus, the unsorted objects arriving from the conveyor path may be transferred selectively and optionally to one of the two conveyor circuits and may be stored in groups therein, whereafter the groups may be retransferred one after another, as a sequence of sorted groups, to the conveyor path. By selectively transferring the objects from one conveyor circuit to the other conveyor circuit, from the other conveyor circuit back to the first conveyor circuit or to the conveyor path, a lot of additional sorting criteria can be met, for example, the order of objects within the groups may be altered. It is also possible, of course, to selectively allow the objects on the conveyor path to travel past the switching means without being transferred to any of the conveyor circuits.

Moreover, the conveyor circuits and conveyor path are arranged such that the conveying direction is reversible and that different conveying velocities may be implemented in the various conveyor circuits or paths.

In an embodiment of the invention, the conveyor circuits are arranged at a same level at least in the area of the switching means; it is particularly advantageous, however, if the entire sorting installation is provided at the same level, i.e. if the rails of the conveying structure extend within one plane. The conveyor circuits and the conveyor path may be advantageously driven by chain conveyors provided with pushing or pulling means for releasably engaging the roller devices. While it is possible to design the switching means such that objects present in either conveyor circuit can be retransferred only to the conveyor path or to the other conveyor circuit, a preferred embodiment of the invention provides for a design of the switching means allowing the objects to selectively travel past the switching means without leaving the conveyor circuit in which the objects are present.

In a preferred embodiment of the invention, there are successively arranged along the conveyor path a plurality of conveyor circuit pairs each consisting of two driven conveyor circuits on opposite sides of the conveyor path, with each conveyor circuit pair comprising a switching means of the abovementioned type. Owing to this design, the variety of sorting criteria may be further enhanced at a considerable velocity even if there is a multiplicity of objects to be sorted according to various features.

If the conveyor path itself is arranged as a conveyor portion of an additional conveyor circuit, a choice may be made whether the objects are gathered in three conveyor circuits and/or selectively transferred to each of three conveyor circuits.

The additional conveyor circuit advantageously comprises two conveyor portions travelling in opposite directions, with one of the conveyor circuits extending between these two conveyor portions and being connected to both conveyor portions through the switching means. In other words, the conveyor circuit comprises a second conveyor portion whose travelling direction is opposite to that of the first-mentioned conveyor portion, with one conveyor circuit of one of the conveyor circuit pairs extending between said conveyor portions and forming an additional conveyor circuit pair—having a switching means of the above-described type—at the second conveyor portion having an additional conveyor circuit. Alternatively, the two conveyor portions may be interconnected through one or several transfer mechanisms, rather than by one or several of the conveyor circuits. According to this advantageous embodiment, one of the conveyor circuits may act as a sorting conveyor circuit on the one hand, and as a transfer mechanism for the additional conveyor circuit on the other hand, thus enabling a plurality of sorting operations to be carried out at the same time.

According to another advantageous embodiment of the invention, at least two additional conveyor circuits are provided and connected to each other through at least one of the conveyor circuits circulating in opposite directions. In this way, any number of conveyor circuits, or even entire sorting installations, may be connected to each other. Alternatively, the two additional conveyor circuits may be interconnected one or several transfer mechanisms, rather than by one or several of the conveyor circuits circulating in opposite directions.

According to still another advantageous embodiment of the invention, at least one of the conveyor circuits circulating in opposite directions comprises one or several driven transfer mechanisms circulating in the same direction and connected to the conveyor circuits through controllable switching means, said transfer mechanisms being adapted to transfer the roller devices, together with the objects to be sorted selectively, from one side of the respective conveyor circuit to the opposite side thereof. Alternatively or additionally, one or several of the additional conveyor circuits may advantageously each comprise one or several driven transfer mechanisms circulating in the same direction and connected to the additional conveyor circuits through controllable switching means, said transfer mechanisms being adapted to transfer the roller devices, together with the objects to be sorted selectively, from a first conveyor portion of the associated additional conveyor circuit to the opposite conveyor portion thereof. The advantage of combining the transfer mechanisms with the sorting circuits resides, inter alia, in that the additional transfer mechanism permits the connecting, storing and sorting operations to be coordinated even better; at the same time, an increased number of concurrent sorting processes is provided as an additional option, thus improving the efficiency of the sorting installation.

Embodiments of switching means that are capable of performing the diverting functions specified according to the invention are known as such in the art and can be used. In so doing, one or several switch blades may be provided in the switching means, depending on the type of roller device to which the objects to be conveyed are attached.

BRIEF DESCRIPTION OF THE DRAWINGS

The invention will be described with reference to exemplary embodiments apparent schematically from the drawing figures, in which:

FIG. 2 illustrates a sorting installation according to the invention comprising multiple conveyor circuit pairs on opposite sides of straight conveyor paths;

FIGS. 3 to 6 depict further variations of a sorting installation according to the invention;

FIG. 7 shows a sorting installation according to the invention corresponding to FIG. 1, comprising conveyor routes in the form of twin rails;

FIG. 8 illustrates an embodiment of a switching means according to the invention, for the sorting installation in FIG. 7, at different switching positions;

FIGS. 13A to 13C schematically illustrate various switching positions of a combination of transfer mechanisms as shown in FIG. 12.

DETAILED DESCRIPTION OF THE PREFERRED EMBODIMENTS

Figure 1A:
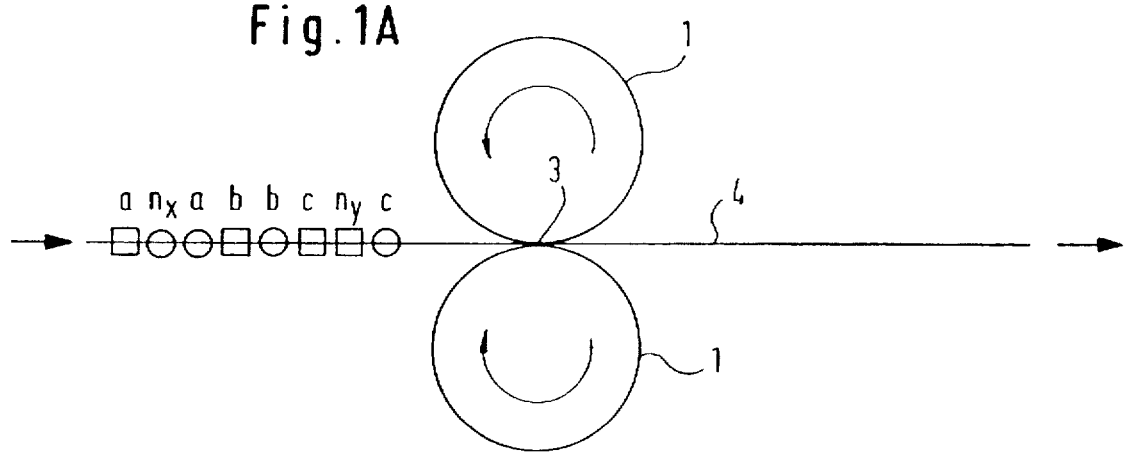
FIG. 1 shows a sorting installation according to the invention comprising two small conveyor circuits on opposite sides of a straight conveyor path.

When using the term "conveyor circuit" in the present disclosure, this means an endless conveyor loop, which does not, however, require the conveyor route to be geometrically circular. Further, the expressions "driven conveyor circuit", "driven conveyor path" and "driven conveyor portion" mean that said conveyor items are equipped with a driven conveying means, such as a conveyor chain or driven ribbon or other conveying drive means.

According to FIG. 1, there are provided two small conveyor circuits 1 comprising circular conveyor routes, with a straight conveyor path 4 passing between them. The conveyor circuits 1 touch each other, and the conveyor path 4 passes through the mutual tangent point of the conveyor circuits. The two conveyor circuits 1 convey in opposite directions which, between the conveyor circuits 1, coincide with the conveying direction of the conveyor path 4. A controllably actuable switching means 3 is provided between both conveyor circuits 1 and the conveyor path 4; in FIG. 1, the switching means 3 is only indicated by its reference numeral. The switching means 3 is at least constructed such that the objects a, b, c . . . n present on the conveyor path 4 upstream of the conveyor circuits 1 in FIG. 1A can travel selectively—depending on the blade position of the switching means 3—into either conveyor circuit 1, from either conveyor circuit 1 back to the conveyor path 4, from one conveyor circuit 1 to the other conveyor circuit 1, or past the conveyor circuits 1 without entering any of these.

Figure 1B:
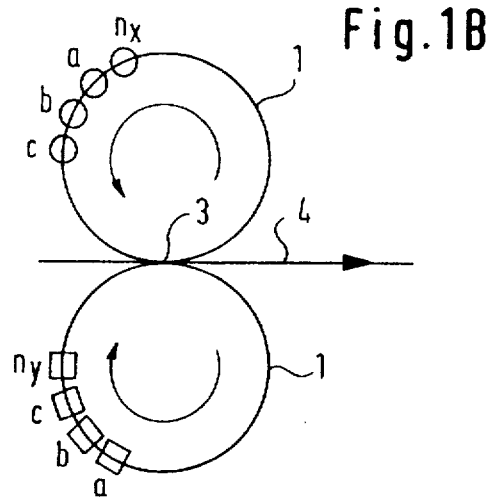
Figure 1C:
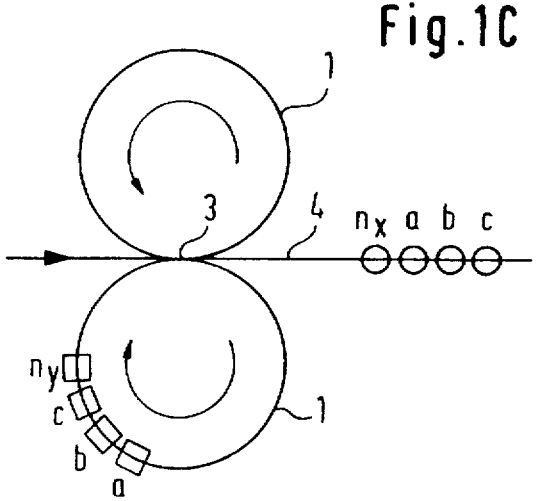
Figure 1D:
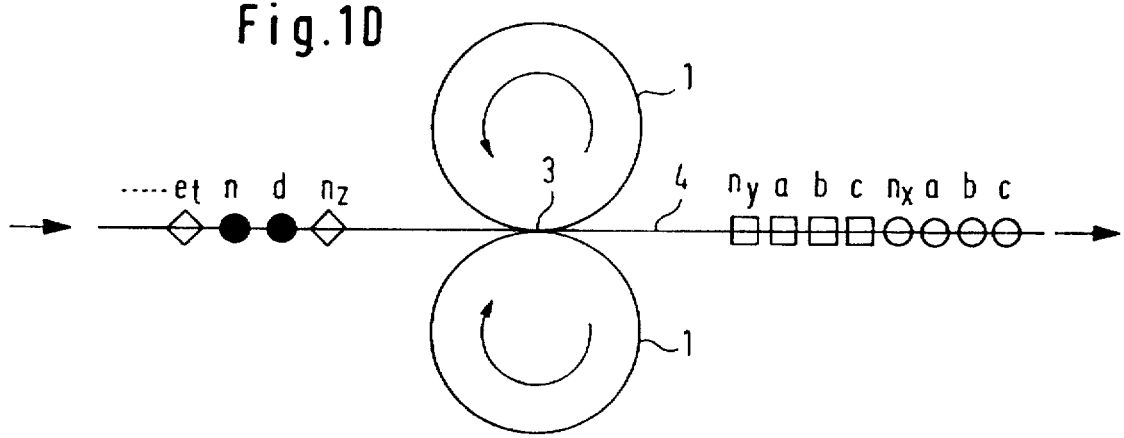

The objects a, b, c, ... n to be sorted arrive in an unsorted sequence from the conveyor path 4. According to FIGS. 1A to 1C, two types of objects, each designated by a circle or square in the Figures, are to be sorted into groups of uniform types. To this end, the objects are first transferred to one or the other conveyor circuit 1, depending on the respective type of object, and accumulated therein, as illustrated in FIG. 1B, whereupon one type group is retransferred to the conveyor path 4, while the other type group remains preliminarily in the conveyor circuit 1 where it has been accumulated (FIG. 1C). Thereafter, said other type group is likewise retransferred to the conveyor path 4 so that the objects are now available on the conveyor path 4 in the form of two successive sorted type groups (FIG. 1D). In the same manner, other objects of further types, as represented by filled circles and diamonds in FIG. 1D, may then be sorted to further groups.

In addition, if the switching means 3 is adapted to allow the objects passing the switching means 3 to selectively remain in the conveyor circuit 1 in which they have been present, the objects can be sorted into a desired order even within the type group by retransferring them selectively to the conveyor path 4 in the desired order.

In the embodiment according to FIG. 2, a plurality of conveyor circuit pairs consisting of conveyor circuits 1 and 2 are arranged on opposite sides of conveyor portions 5 and 6 of an additional conveyor circuit 7, with the elongate large conveyor circuits 2 extending between said two conveyor portions 5 and 6 and cooperating there with the associated small conveyor circuits 1 to form respective pairs of conveyor circuits. Again, a switching means is disposed between each of the conveyor circuit parts and the associated conveyor portion. The objects a, b, . . . h can be fed via switching means from a feed conveyor 8 to the additional conveyor circuit 7, and discharged from the additional conveyor circuit 7 by a discharge conveyor 9.

The sorting scheme corresponds to that described it connection with FIG. 1. In FIG. 2, the sorting scheme is represented for the case where four types of objects are to be sorted into type groups in which the number of objects varies from type to type; further, the objects are also to be sorted into a desired sequence within their respective groups. In FIG. 2, five conveyor arrangements A to E are shown, each arrangement consisting of two conveyor circuit pairs and a respective conveyor path. i.e. conveyor portion 5 or 6, passing between the conveyor circuits 1, 2 of said pairs, with switching means 3 inserted therebetween. While the respective sorting progress is illustrated in neighboring conveyor arrangements A to E, the whole sorting progress may actually take place in any single one of these conveyor arrangements.

The various types of objects are symbolized by dashes, squares empty circles and filled circles, respectively, while the letters a, b, c, ... are reference signs indicating the order in which the objects are to be sorted. First, the objects are completely unsorted in the large conveyor circuit 2, as apparent from conveyor arrangement A. Then, first the objects represented by dashes and empty circles are sorted to one of the two small conveyor circuits 1 by circulating the objects in the conveyor circuit 2 and transferring objects of a given type to the associated small conveyor circuit 1 each time an object of that type travels through the associated switching means, until all objects to be sorted are assembled in the associated small conveyor circuit 1. This intermediate result is illustrated for conveyor arrangement B. Thereafter, the objects are selectively retransferred from the small conveyor circuits 1 to the large conveyor circuit 2, according to the desired sequence of the objects, as illustrated for conveyor arrangement C. Further, these sorting steps are now repeated for the other objects to be sorted symbolized by squares and filled circles, respectively (conveyor arrangement D), until all objects are grouped according to their types, and sorted within the groups according to their sequence, on the large conveyor circuit 2, as shown for conveyor arrangement E.

FIG. 3 shows a sorting installation according to the invention, in which the conveyor paths likewise consist of two conveyor portions 5 and 6 of an additional conveyor circuit 7, and multiple conveyor circuit pairs are arranged at intervals along these conveyor portions 5, 6.

Figure 4:
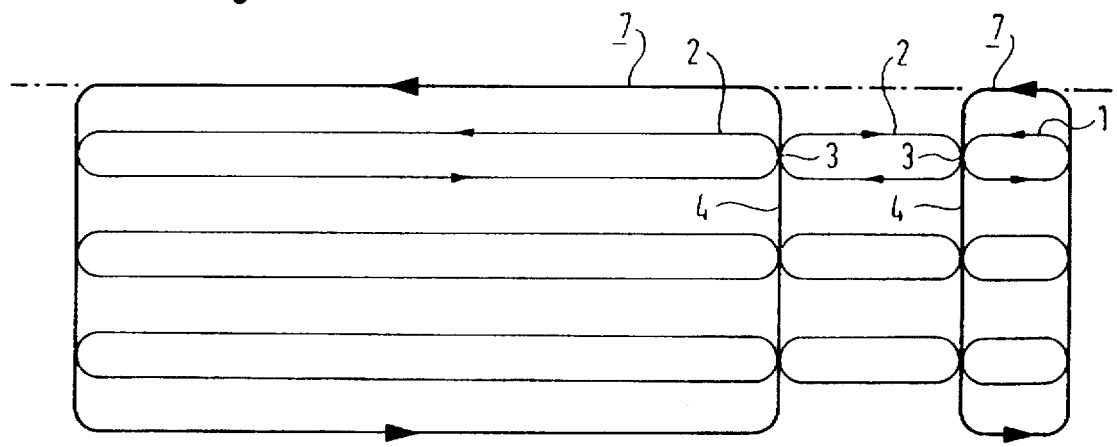
Figure 5:
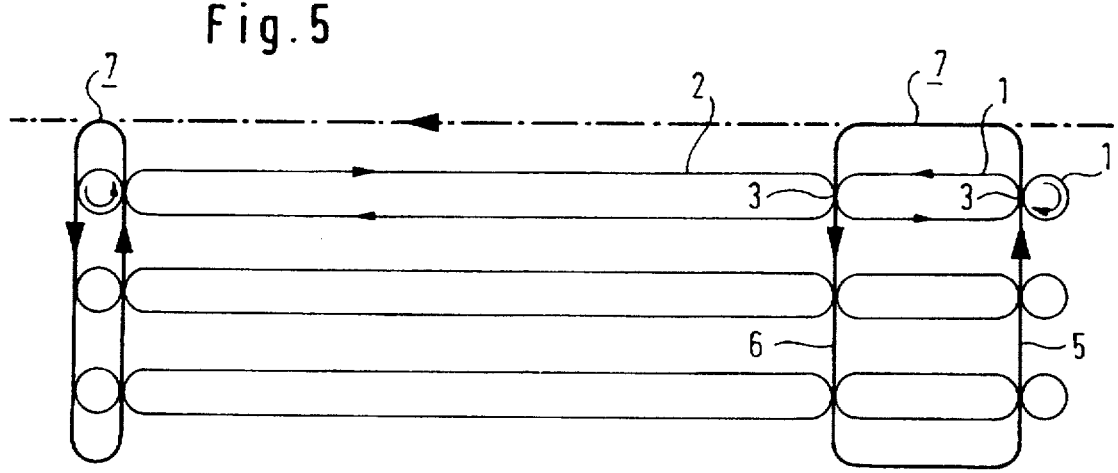
Figure 6:
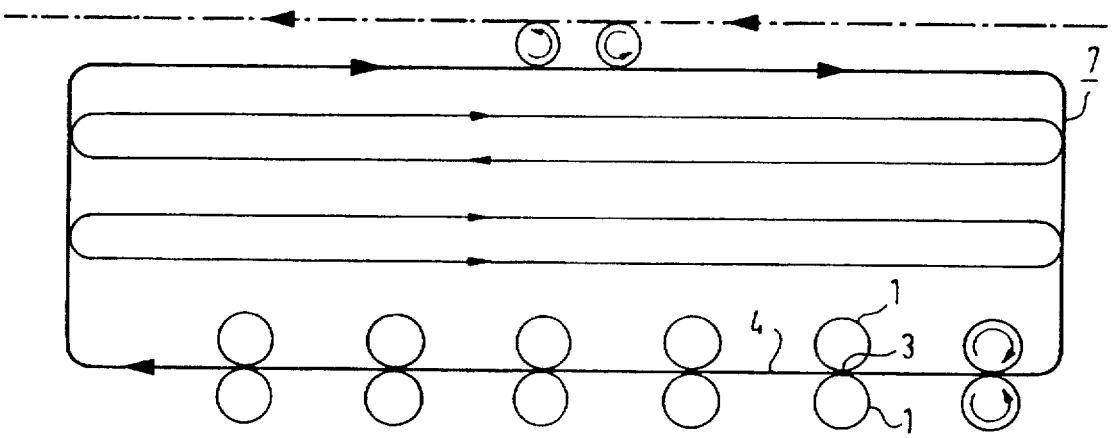

According to FIG. 4, two additional conveyor circuits 7 are provided and interconnected through conveyor circuit pairs according to the invention consisting of large conveyor circuits 2 and small conveyor circuits 1. Another embodiment of such a variation is depicted in FIG. 5. Conversely, FIG. 6 shows an embodiment in which several conveyor circuit pairs each consisting of two small conveyor circuits 1 are arranged successively along one of the conveyor portions of an additional conveyor circuit 7.

FIG. 7 shows the rail system of a sorting installation according to the invention at the place of a conveyor circuit pair consisting of two conveyor circuits 1 with a conveyor path 4 and a switching means 3 of the above-described type arranged therebetween. The objects are conveyed with the help of roller devices 10. Controllably actuable stop members 11 are provided at the conveyor circuits 1, allowing to selectively stop the roller devices 10 in the particular conveyor circuit so that the roller devices 10 can be accumulated therein for predetermined time spans.

FIG. 8 shows an example of a switching means according to the invention in a rail system according to FIG. 7. The switching means comprises two pivotal double switch blades 12a and 12b either oriented towards the conveyor path 4, or switched to the left or right towards either of the conveyor circuits 1. One double switch blade 12a may be omitted if the conveying installation is only designed for one respective conveying direction as shown by the arrows. Preferably, however, the conveying directions are reversible; hence, the switching means is accordingly adapted. FIG. 8A depicts the neutral position of the double switch blades 12, in which position the roller device 10 arriving from conveyor path 4 can travel past the switching means without being diverted to one conveyor circuit 1 or the other conveyor circuit 1. FIG. 8B shows the switching position of double switch blade 12b when a roller device 10 is to be transferred to the right-hand conveyor circuit 1 in the Figure, whereas the roller device 10 is transferred to the left-hand conveyor circuit 1 in the Figure when the double switch blade takes the switching position shown in FIG. 8C.

The roller devices 10 arriving at the switching means from either conveyor circuit 1 can urge the double switch blade 12a from its neutral position, e.g. against a resilient force, towards either direction without requiring any controlled actuation of this double switch blade; once the roller device 10 has travelled past the switching means, the double switch blade 12a will return to its neutral position owing to said resilient force, whereafter the current switching position of double switch blade 12b will determine whether the roller device 10 is reverted to the conveyor circuit 1 where it came from, retransferred to the conveyor path 4 or diverted to the other conveyor circuit 1.

Figure 9:
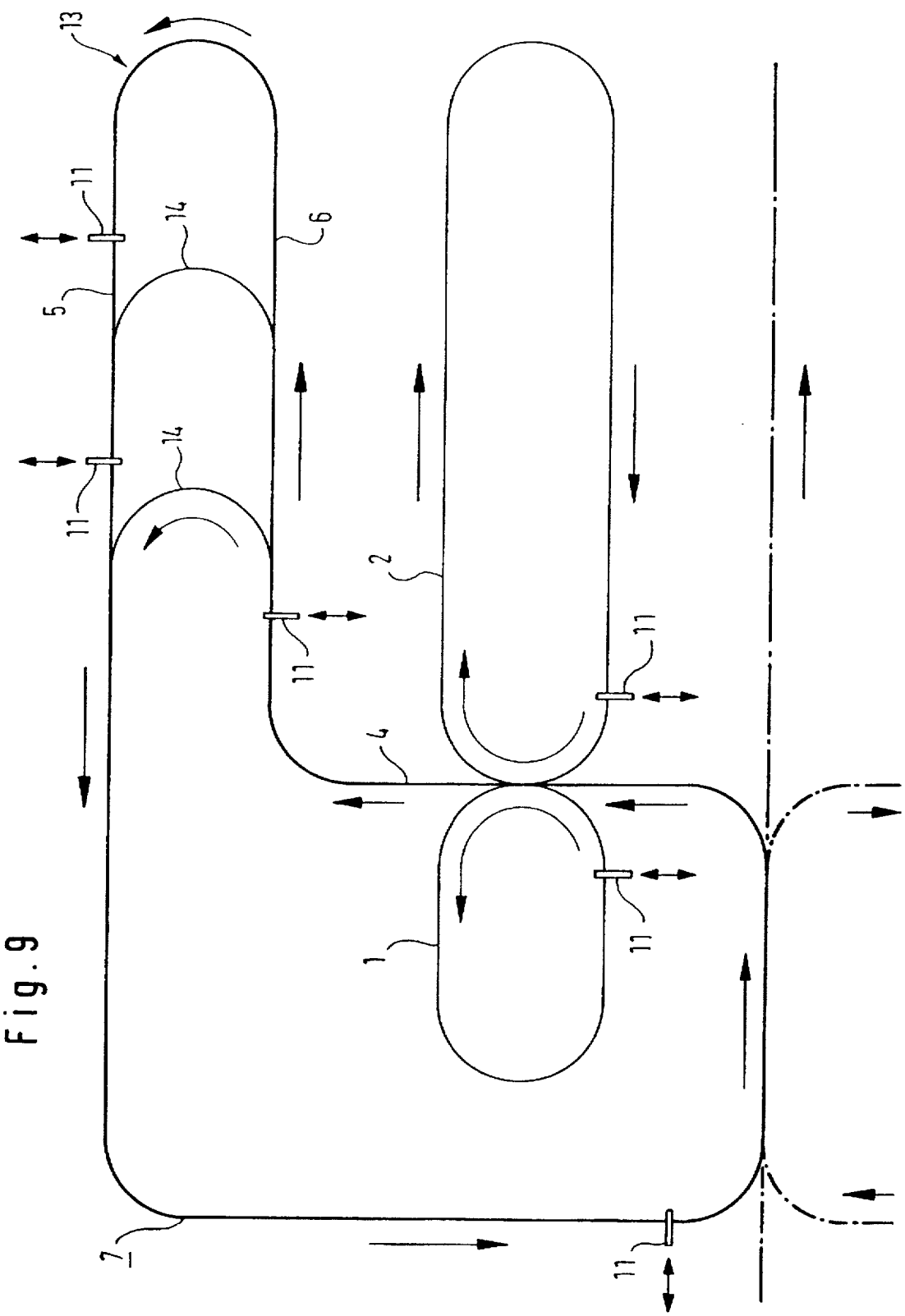
FIG. 9 shows another embodiment of a sorting installation according to the invention, comprising multiple conveyor circuits and transfer mechanisms.
Figure 10A:
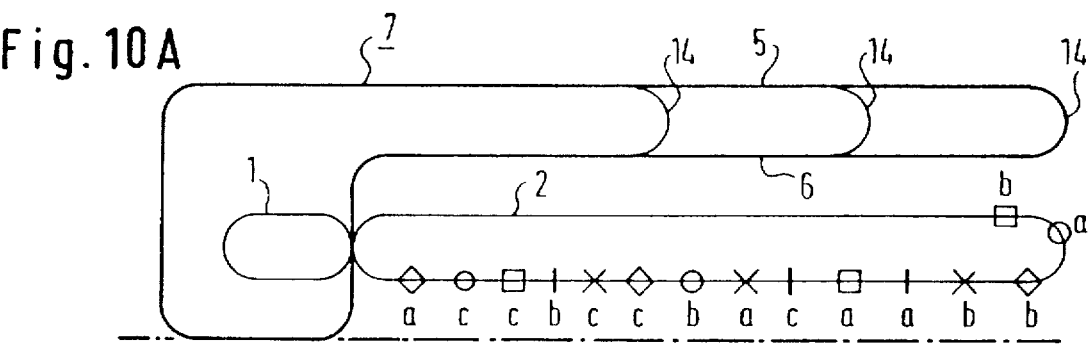
FIGS. 10A to 10E illustrate an exemplary application of the sorting installation shown in FIG. 9.
Figure 10B:
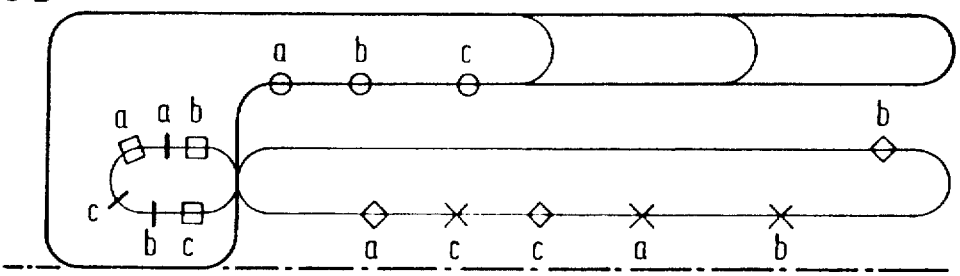
Figure 10C:
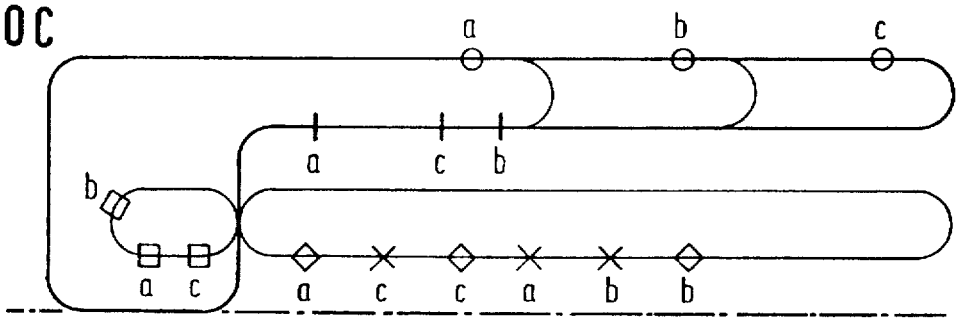
Figure 10D:
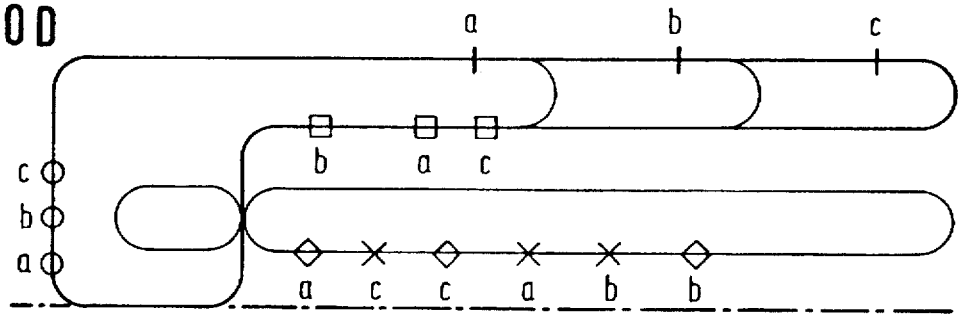
Figure 10E:
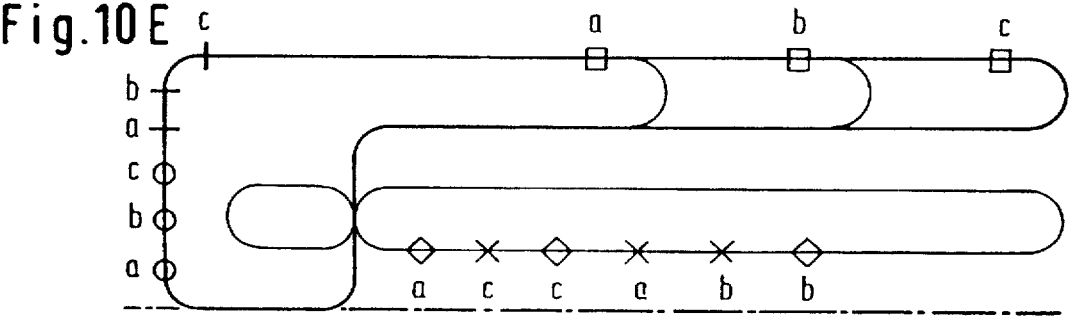
Figure 11A:
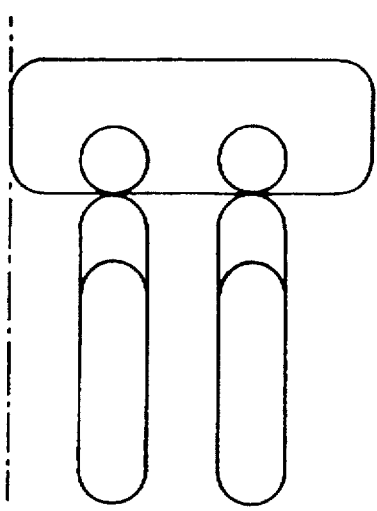
FIGS. 11A to 11F illustrate further embodiments of the sorting installation according to the invention, comprising various combinations of connecting, storing and sorting circuits.
Figure 11D:
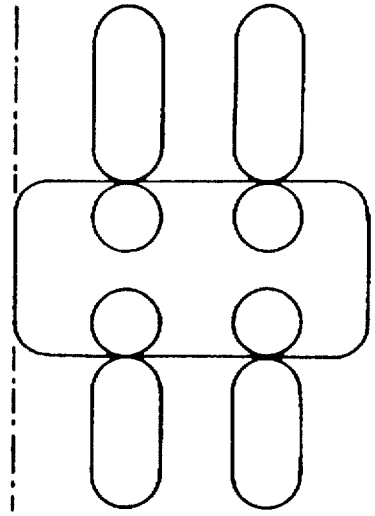
Figure 11B:
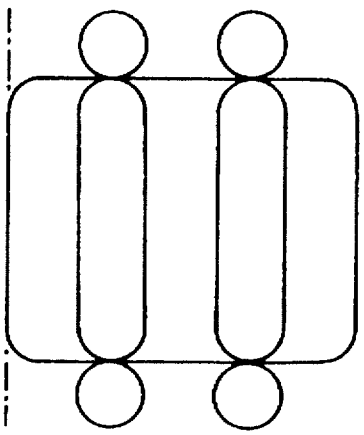
Figure 11E:
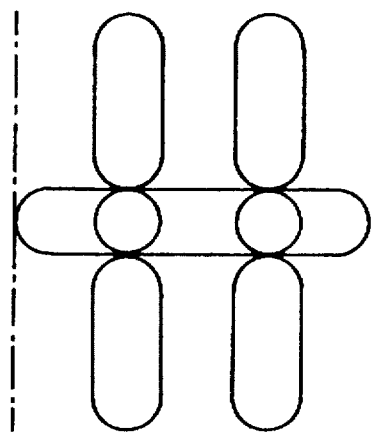
Figure 11C:
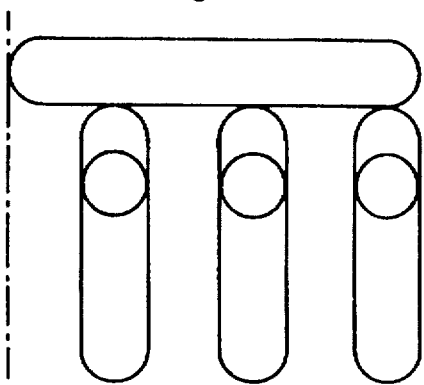
Figure 11F:
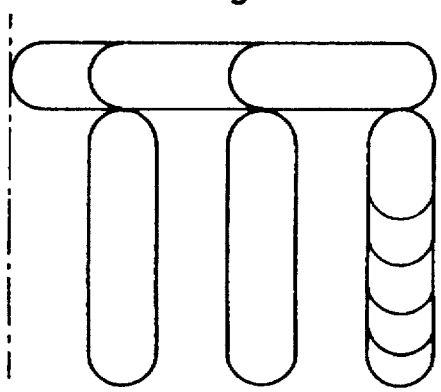

Another exemplary embodiment of a sorting installation is depicted schematically in FIG. 9; this sorting installation comprises two driven conveyor circuits 1 and 2 circulating in opposite directions and diverting from, and reverting to, a conveyor path 4 via a switching means such as that illustrated by way of example in FIGS. 8A to 8C; a small range of the conveyor path 4 concurrently forms part of both conveyor circuits 1 and 2. The conveyor circuits 1 and 2 may comprise a separate circulating drive system, such as a circulating driven chain provided with a plurality of pushing or pulling means for entraining the roller devices 10. In particular the conveyor circuit 2 is formed as an elongate oval in this embodiment and thus lends itself not only to sorting but also to accumulation and storage.

The conveyor path 4 in turn forms part of the additional conveyor circuit 7 which is provided with an additional conveyor loop 13 at the upper right-hand end in the Figure, said loop 13 comprising two driven transfer mechanisms 14 allowing to transfer roller devices from one side of loop 13 to the other loop side travelling in the opposite direction. Any forms and types of transfer mechanism are possible. Thus, the transfer mechanism may take the form of a rail along which drive is provided by a chain, or it may be formed as a driven transfer wheel.

Moreover, several stop members 11 may be arranged in the additional conveyor circuit 7 as well as in the conveyor circuits 1 and 2, said stop members 11 allowing to stop and accumulate the roller devices.

A further additional conveyor circuit, indicated only in chain-dotted lines in FIG. 9, may adjoin the aforementioned additional conveyor circuit 7.

FIGS. 10A to 10E illustrate the operation of the sorting installation shown in FIG. 9. As apparent from these Figures, the objects a, b and c shown by way of example are first present in an unsorted manner in the conveyor circuit 2 serving as a sorting and storing circuit; on the one hand, these objects can be sorted by selectively transferring them from conveyor circuit 2 to conveyor circuit 1 or selectively transferring them from conveyor circuit 1 or 2 to the additional conveyor circuit 7. On the other hand, the objects a, b and c can be sorted or separated by selective transfer through the transfer mechanisms 14 such that a sufficiently large space is present between two successive objects (cf. FIGS. 10C to 10E, for example). In addition, the objects or roller devices carrying the objects a to c can be stopped, in the conveyor circuits 1 and 2 as well as in the additional conveyor circuit 7, by the stop members 11 disposed at various places, whereby connecting, storing and sorting are implemented in an optimal fashion. Moreover, the additional sorting option provided by the transfer mechanisms 14 can increase the number of sorting operations carried out simultaneously, resulting in an increased sorting velocity of the installation.

Further combinations of connecting, sorting and storing circuits are illustrated in FIGS. 11A to 11F.

Figure 12:
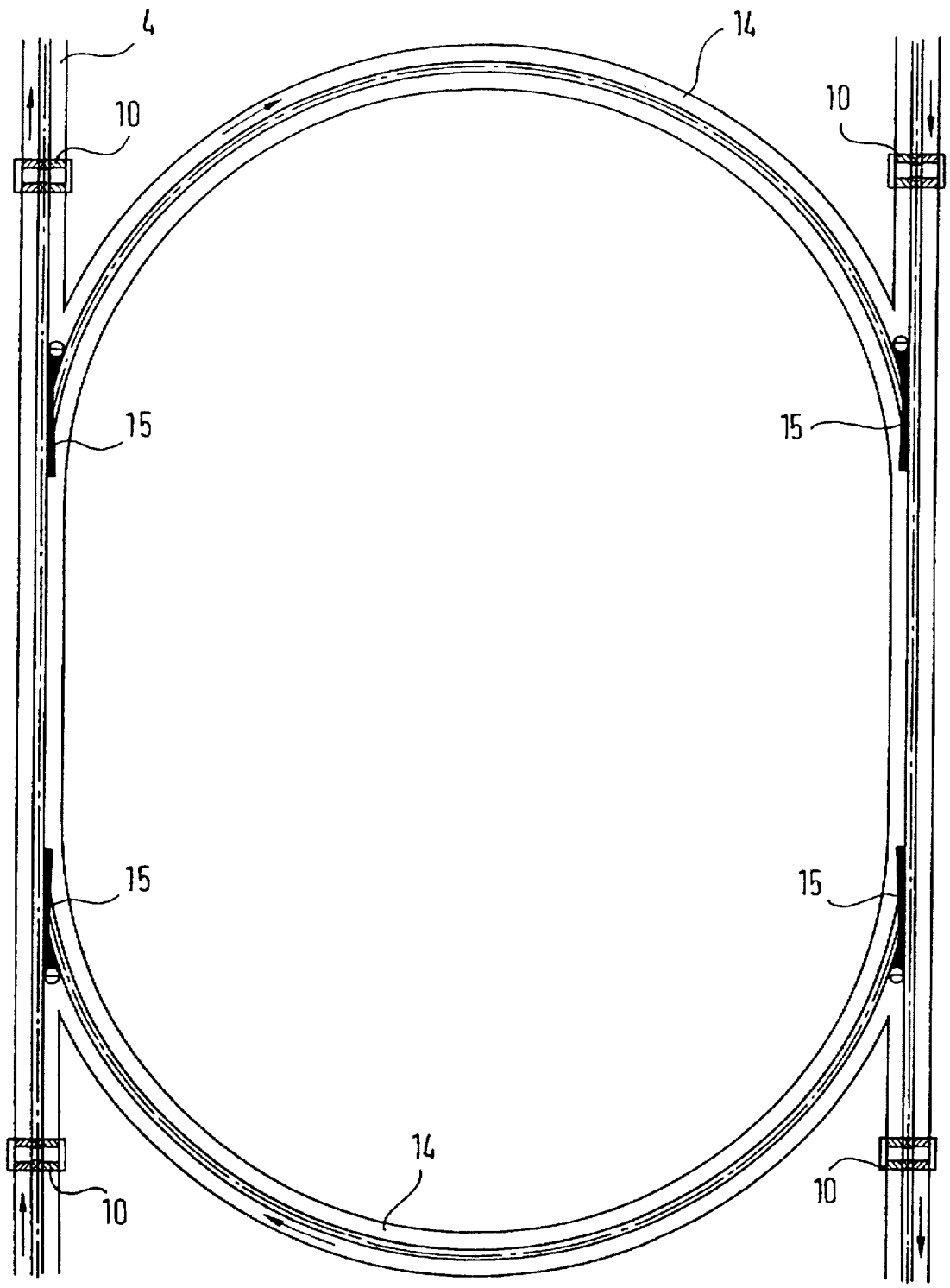
FIG. 12 is a plan view of two transfer mechanisms acting between two conveyor paths having opposite directions of travel.

FIG. 12 is a plan view of two transfer mechanisms 14 acting between two conveyor paths 4 travelling in opposite directions. In other words, the two transfer mechanisms 14 and the conveyor path portions between the transfer mechanisms 14 together form a conveyor circuit.

FIGS. 13A to 13C are partial schematic plan views of different switch positions in a combination of transfer mechanisms of the type illustrated in FIG. 12. The sole difference from the combination of transfer mechanisms illustrated in FIG. 12 resides in that the portions of the conveyor paths 4 between both transfer mechanisms are designed shorter so that the two transfer mechanisms together substantially form a circle. In the switch position according to FIG. 13A, the switch blades 15 are set such that a roller device can be issued from the lower transfer mechanism in the Figure to the conveyor path 4, whereas in the switch blade position shown in FIG. 13B, the roller devices can just pass along the conveyor path 4 without being transferred, and in the switch blade position shown in FIG. 13C, a roller device can be diverted from conveyor path 4 into the upper transfer mechanism 14 in the Figure.

We claim:

1. A suspension conveyor comprising:
   two conveyor circuits (1, 2) having pushing or pulling means circulating in opposite directions, the two conveyor circuits (1, 2) being arranged as a conveyor circuit pair on opposite sides of an additional conveyor path (4), the conveying direction of both conveyor circuits (1, 2) coinciding with a conveying direction of said additional conveyor path (4);
   roller devices (10) for carrying objects (a,b . . . n), said roller devices being entrained by the pushing or pulling means of the conveyor circuits (1, 2); and
   a controllable switching means (3) arranged between the conveyor circuits (1, 2), for transferring the objects individually from one of the conveyor circuits to the other conveyor circuit, said switching means being adapted to transfer the objects selectively from the conveyor path (4) to either of the conveyor circuits (1, 2) and from either of the conveyor circuits (1, 2) to the conveyor path (4);
   characterized in that
   the suspension conveyor is a sorting installation including means connected to the said switching means for sorting numerous different individually conveyed objects (a,b, . . . n) in the sorting installation;
   the conveyor circuits (1, 2) and the additional conveyor path (4) extend within one plane;
   said additional conveyor path (4) forming part of both conveyor circuits (1, 2) over at least an infinitesimal path portion at the place of the switching means (3) and extends over said at least infinitesimal path portion in the same direction as the conveyor circuits (1, 2); and
   that the switching means (3) is further adapted to selectively allow the objects to travel past the switching means without leaving the respective conveyor circuit (1, 2) in which the objects are present.

2. The suspension conveyor according to claim 1, wherein there are successively arranged along the conveyor path (4) a plurality of conveyor circuit pairs each consisting of two conveyor circuits (1, 2) on opposite sides of the conveyor path, with each conveyor circuit pair comprising a switching means (3).

3. The suspension conveyor according to claim 1, wherein the conveyor path (4) itself is arranged as a conveyor portion (5) of an additional conveyor circuit (7).

4. The suspension conveyor according to claim 3, characterized in that the additional conveyor circuit (7) comprises two conveyor portions (5, 6) travelling in opposite directions, with one of the conveyor circuits (1 or 2) extending between these two conveyor portions (5, 6) and being connected to both said conveyor portions (5 and 6) through the switching means (3).

5. The suspension conveyor according to claim 3, characterised in that at least two additional conveyor circuits (7)

are provided and connected to each other through at least one of the conveyor circuits (2) circulating in opposite directions.

6. The suspension conveyor according to claim 1, characterized in that at least one of the conveyor circuits (1, 2) circulating in opposite directions comprises one or several driven transfer mechanisms (14) circulating in the same direction and connected to the conveyor circuits through said controllable switching means, said transfer mechanisms (14) being adapted to transfer the roller devices (10), together with the objects to be sorted selectively, from one side of the respective conveyor circuit (1, 2) to the opposite side thereof.

7. The suspension conveyor according to claim 3 characterized in that one or several of the additional conveyor circuits (7) each comprise one or several driven transfer mechanisms (14) circulating in the same direction and connected to the additional conveyor circuits (7) through said controllable switching means, said transfer mechanisms (14) being adapted to transfer the roller devices (10), together with the objects to be sorted selectively, from one of the conveyor portions (5 or 6) to another one of the conveyor portions (6 or 5).

* * * * *